United States Patent
Bonomi (10) Patent No.: US 11,808,236 B2
(45) Date of Patent: Nov. 7, 2023

(54) GAS ULTRASONIC TRANSDUCER SYSTEM AND METHOD FOR OPERATING A DIESEL COMMON-RAIL ENGINE

(71) Applicant: ABLABS, SIA, Jūrmala (LV)

(72) Inventor: Alberto Bonomi, Jūrmala (LV)

(73) Assignee: ABLABS, SIA, Jurmala (LV)

( * ) Notice: Subject to any disclaimer, the term of this patent is extended or adjusted under 35 U.S.C. 154(b) by 0 days.

(21) Appl. No.: 17/765,448

(22) PCT Filed: May 21, 2020

(86) PCT No.: PCT/EP2020/064219
§ 371 (c)(1),
(2) Date: Mar. 31, 2022

(87) PCT Pub. No.: WO2021/073783
PCT Pub. Date: Apr. 22, 2021

(65) Prior Publication Data
US 2022/0372933 A1  Nov. 24, 2022

(30) Foreign Application Priority Data

Oct. 14, 2019 (WO) .................. PCT/IB2019/058736

(51) Int. Cl.
*F02M 25/025* (2006.01)
*F02M 21/04* (2006.01)

(52) U.S. Cl.
CPC .......... *F02M 25/025* (2013.01); *F02M 21/04* (2013.01)

(58) Field of Classification Search
CPC .. F02M 25/025; F02M 21/04; F02M 25/0225; F02M 25/022; F02M 31/18

(Continued)

(56) References Cited

U.S. PATENT DOCUMENTS 5,568,800 A * 10/1996 Einaudi .................. F02M 17/16
  123/546
6,557,719 B1 * 5/2003 Arnal .................. B60K 15/035
  220/4.12

(Continued)

FOREIGN PATENT DOCUMENTS

JP  2017207062 A  11/2017
WO  2018/069360 A1  4/2018

*Primary Examiner* — Yi-Kai Wang (57) ABSTRACT

The invention relates to systems enabling use of liquefied petroleum gas in diesel common-rail engines, and in particular to fueling diesel engines with diesel gas dual-fuel or only gas instead of diesel fuel. A gas ultrasonic transducer system for operating a diesel common-rail engine, comprises an electronic control unit; a water tank; a gas tank with gas supply shut-off valve; a gas level sensor; a gas pump operably connected with the gas tank; a water pump operably connected with the water tank; a mixer comprising a water level sensor and an ultrasonic transducer adapted to generate water vapor and gas mixture; wherein the mixer comprises two compartments: the upper compartment and the lower compartment, the means for separation of the upper and the lower compartments comprising an anti-reflux valve adapted to allow water vapor from the lower compartment to pass through the anti-reflux valve to the upper compartment and to prevent any liquid water from flowing into the upper compartment wherein the upper compartment of the mixer comprises an outlet operably connected with engine intake manifold; wherein the outlet of the gas pump is operably connected with the upper compartment of the mixer, the outlet of the water pump is operably connected with lower compartment of the mixer, where the ultrasonic transducer is located below the anti-reflux valve. The controlled interaction between elements of the system and vehicle elements results in a gas-water vapor mixture. In case of embodiment with dual fuel, the water gas mixture is (Continued)

calculated on the grounds of information received by the electronic control unit of the system from the engine common-rail, the engine temperature sensor, the air flow meter sensor, the acceleration pedal block.

9 Claims, 7 Drawing Sheets

(58) Field of Classification Search
USPC .................................................. 123/25 A
See application file for complete search history.

(56) References Cited

U.S. PATENT DOCUMENTS

| | | | |
|---|---|---|---|
| 6,698,387 B1 | 3/2004 | McFarland | |
| 2008/0184976 A1* | 8/2008 | Johnston | F02D 19/0655 |
| | | | 123/575 |
| 2009/0063022 A1* | 3/2009 | Ishizuka | F02D 41/247 |
| | | | 701/106 |
| 2012/0186557 A1* | 7/2012 | Jenkins | B05B 17/0615 |
| | | | 123/434 |
| 2018/0283307 A1* | 10/2018 | Dudar | F02M 26/49 |
| 2018/0355813 A1* | 12/2018 | Arihara | F02P 5/045 |

* cited by examiner

GAS ULTRASONIC TRANSDUCER SYSTEM AND METHOD FOR OPERATING A DIESEL COMMON-RAIL ENGINE

TECHNICAL FIELD

The invention relates to systems enabling use of gas, in particular alkane gases or mixtures thereof, such as liquefied petroleum gas (LPG), natural gas (e.g. CNG and LNG) and the respective bio equivalents—Bio-LPG, Bio-CNG and Bio-LNG, in diesel common-rail engines, and in particular to fueling diesel engines with diesel—gas dual-fuel or only gas (e.g. LPG, CNG, LNG, bio-LPG, bio-CNG, bio-LNG), instead of diesel fuel.

BACKGROUND ART

With increasing environmental impact on transportation, the demand for sustainable fuels and fuel systems is increasing. The alkane gases, in particular, liquid petroleum gas (LPG) and natural gas are known as a cleaner alternative fuel for a production engine.

The engine using both diesel fuel and LPG, CNG or LNG, is referred to as gas-diesel dual fuel engine. Gas fuel in such engines is typically used as primary fuel and diesel—as secondary fuel. Gas dual fuel engines have a good thermal efficiency at high output but the performance is less during part load conditions because of poor utilization of charges. This problem is tried to be solved by several researchers. Some researchers proposed to vary such factors as pilot fuel quantity, injection timing, composition of the gaseous fuel and intake charge conditions, for improving the performance.

One of more creative approaches was adding water to internal combustion engine (Lestz S J, et. al. Feasibility of cooling diesel engines by introducing water into the combustion chamber. SAE Trans 1975:606-19). This study showed that 5.5 lb of water injection is required per lb of fuel in order to provide removal of the waste heat, which is normally removed by jacket cooling.

Lanzafame's study (Lanzafame R. Water injection effects in a single-cylinder CFR engine. SAE 1999) showed that water injection in the intake pipe can be a way to avoid detonation, to reduce compression work and to control NOx production in spark ignition engines.

There is known an in-cylinder water injection engine (U.S. Pat. No. 5,937,799) utilizing direct, in-cylinder water injection and an optional oxygen enriched air supply. According to the inventor, the in-cylinder low-temperature water injection lowers compression temperatures, which permits increased compression ratios while avoiding preignition. As well, the low-temperature water injected air/fuel increases overall engine efficiency. The known engine comprising: an internal combustion engine having at least one combustion chamber, at least one cylinder head secured to the combustion chamber and at least one piston disposed within said combustion chamber; an air/fuel intake manifold in fluid communication to the combustion chamber through the cylinder head; at least one water injector in fluid communication to the combustion chamber; a constant pressure water source connected to the water injector by a water conduit; a valve in the water conduit responsive to the compression cycle of the engine to open and let water flow to the water injector during each compression cycle of the engine; a source of enriched oxygen connected to air to the air/fuel intake manifold by an enriched air conduit; and a turbocharger compressor operatively connected to the exhaust conduit and the enriched oxygen source to compress the air passing to the enriched oxygen source.

There is known an internal combustion engine with steam expansion stroke (U.S. Pat. No. 6,986,252), the engine having at least one cylinder, a reciprocating piston arranged in the cylinder, a combustion chamber delimited by the cylinder and the piston, and inlet and outlet valves that are controlled by a computer-based control system. The combustion engine includes elements for injecting water or water steam into the combustion chamber), and the control system is arranged to control the inlet and outlet valves and the elements for injection of water or water steam such that power strokes that are mainly based on expanding combustion gases are alternated with power strokes that are mainly based on expanding water steam.

There is known a water injection device of an internal combustion engine, and method for operating a water injection device (US10378435). The water injection device comprising: a water tank configured to store water; a conveying element configured to convey the water, the conveying element connected to the water tank; at least one water injector configured to inject water, the at least one water injector connected to the conveying element; a pressure sensor arranged in a line region between the conveying element and the at least one water injector; and a control unit configured, based on pressure data of the pressure sensor, to determine a formation of steam in the line region when the at least one water injector is closed and the conveying element is switched off.

SUMMARY OF INVENTION

The present invention is an improvement provided to solve the conversion problem of existing diesel engines to diesel and gas, such as alkane gases or mixtures thereof (e.g. LPG, CNG, LNG, bio-LPG, bio-CNG, bio-LNG) dual-fuel or only gas fuel engines.

A gas ultrasonic transducer system for operating a diesel common-rail engine, comprises an electronic control unit; a water tank; a gas tank with gas supply shut-off valve; a gas level sensor; a gas pump operably connected with the gas tank; a water pump operably connected with the water tank; a mixer comprising a water level sensor and an ultrasonic transducer adapted to generate water vapor and gas mixture; wherein the mixer comprises two compartments: the upper compartment and the lower compartment, the means for separation of the upper and the lower compartments comprising an anti-reflux valve adapted to allow water vapor from the lower compartment to pass through the anti-reflux valve to the upper compartment and to prevent any liquid water from flowing into the upper compartment; wherein the upper compartment of the mixer comprises an outlet operably connected with engine intake manifold; wherein the outlet of the gas pump is operably connected with the upper compartment of the mixer, the outlet of the water pump is operably connected with lower compartment of the mixer, where the ultrasonic transducer is at least partially located in the lower compartment of the mixer, i.e. below the anti-reflux valve.

The controlled interaction between elements of the system and vehicle elements results in a gas water vapor mixture. In case of embodiment with dual fuel, the water-gas mixture is calculated on the grounds of information received by the electronic control unit of the system from the engine common-rail (pressure from the rail (bar)), from the engine temperature sensor (temperature), from the air flow meter sensor (air flow-$m^3$/s), from the acceleration pedal block (pedal position), from the lambda sensor (air-fuel equivalence ratio). In case of embodiment with gas only, the mixture is calculated on the grounds of information received by the electronic control unit of the system from the engine common-rail (pressure from the rail (bar)), from the engine temperature sensor (temperature), from the air flow meter sensor (air flow-$m^3$/s), from the acceleration pedal block (pedal position), from the crankshaft (engine rpm).

BRIEF DESCRIPTION OF DRAWINGS

FIG. 5 shows a flow chart of a method for operating a diesel common-rail engine using gas ultrasonic transducer system.

DETAILED DESCRIPTION OF INVENTION

According to one embodiment the proposed gas ultrasonic transducer system for operating a diesel common-rail engine (FIG. 1-2), comprises: an electronic control unit 101; a gas supply subsystem, comprising operably connected: a gas tank 207, a gas shut-off valve 213, a gas pressure regulator 212, a gas pump 102, a gas level sensor 208; a water supply subsystem, comprising operably connected: a water tank 209, a water pump 103, a water level sensor 105. The gas ultrasonic transducer system for operating a diesel common-rail engine further comprising a mixer 104 comprising the water level sensor 105 and an ultrasonic transducer 106 adapted to generate water vapor and gas mixture. The outlet of the gas pump 102 is operably connected with the upper compartment 104' of the mixer 104, the outlet of the water pump 103 is operably connected with lower compartment 104" of the mixer 104.

Thus, the mixer 104 (FIG. 1) comprises two compartments: the upper compartment 104' and the lower compartment 104", the means for separation of the upper 104' and the lower 104" compartments comprising an anti-reflux valve 109 adapted to allow water vapor from the lower compartment 104" to pass through the anti-reflux valve 109 to the upper compartment 104' and to prevent liquid water from flowing into the upper compartment 104'; wherein the upper compartment 104' of the mixer 104 comprises an outlet 108, which is operably connected with automobile engine intake manifold 205. The ultrasonic transducer 106 is at least partially located in the lower compartment (104") of the mixer (104). In the air intake manifold 205 the gas (e.g. LPG, CNG, LNG, Bio-LPG, Bio-CNG, Bio-LNG or the like) and water vapor mixture is transported with the air to the engine combustion chamber, where the gas and water vapor mixture ignites together with the air and the diesel fuel spray.

Figure 2:
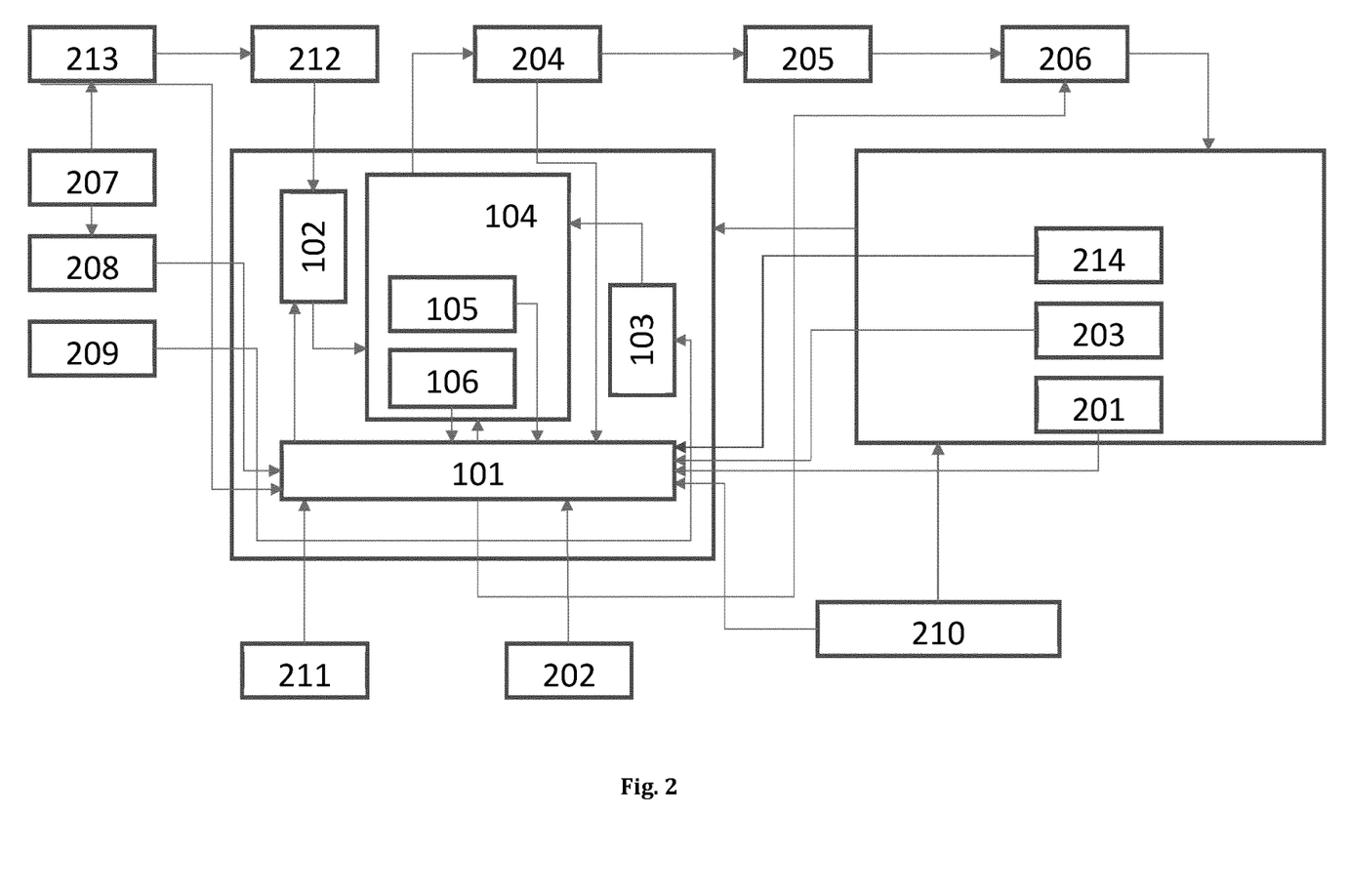
FIG. 2 is a block diagram, representing elements of the proposed gas ultrasonic transducer system as installed in a vehicle having a diesel common-rail engine and operating as diesel and gas dual-fuel engine.
Figure 3:
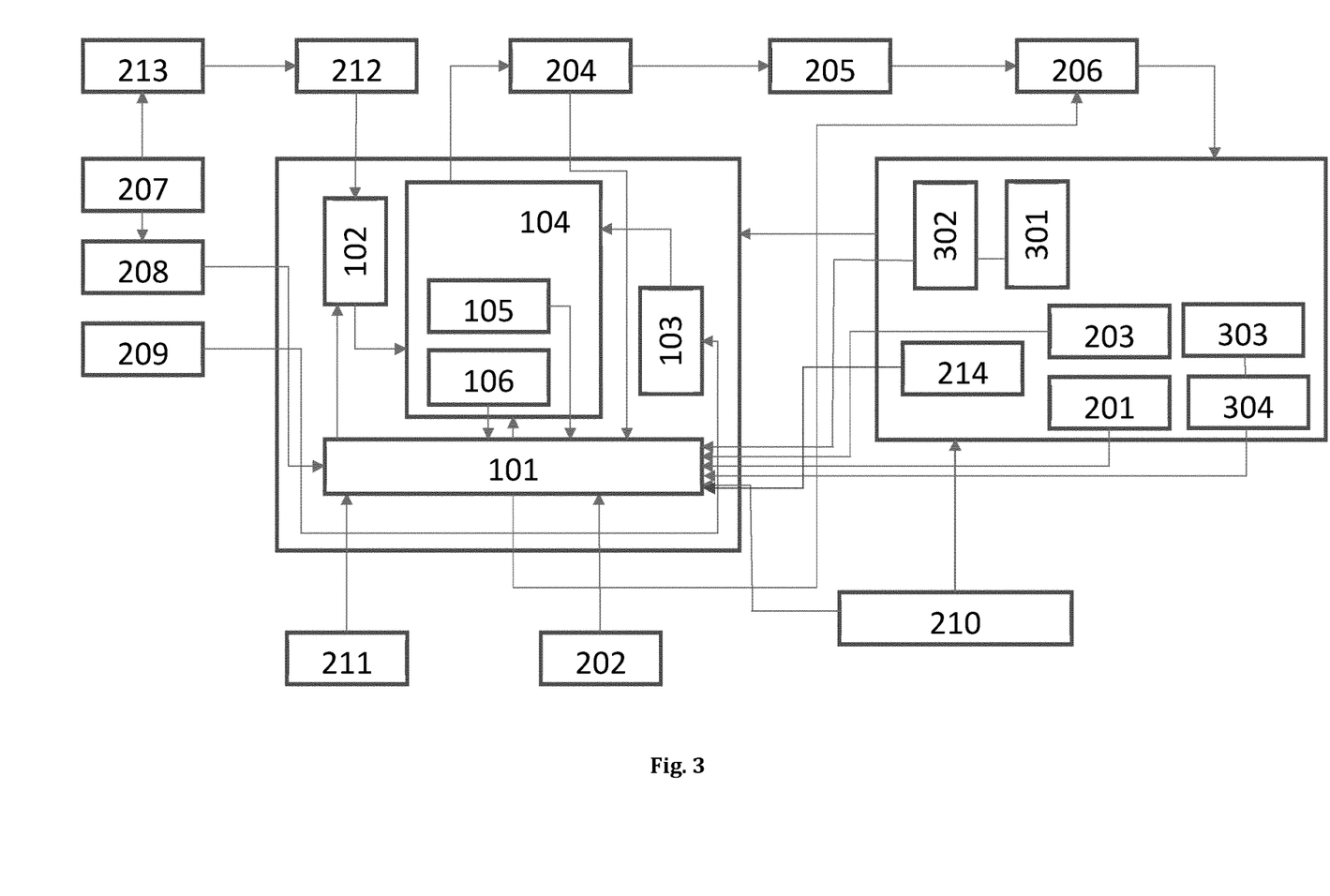
FIG. 3 is a block diagram of another embodiment, representing elements of the proposed gas ultrasonic transducer system as installed in a vehicle having a diesel common-rail engine and operating as gas fuel engine.

The system further comprising an air flow meter sensor 204 operably connected between the mixer 104 outlet 108 and the engine intake manifold 205, the air flow meter sensor 204 is further electrically connected with the electronic control unit 101 and is adapted to measure the gas mixture flow and to send respective signals to the electronic control unit 101 (FIG. 2). Also, the system comprising a lambda sensor 214 operably connected with engine exhaust system; the lambda sensor 214 is further electrically connected with the electronic control unit 101 and is adapted to measure the proportion of oxygen in the gas or liquid being analyzed and to send respective signals to the electronic control unit 101 (FIG. 2).

The electronic control unit 101 is electrically connected with the rail 201 and is designed to receive and read the common-rail pressure signal from the rail 201. Also, the rail 201 signal may be used to control operation of the proposed system (i.a. entering operation mode and stand-by mode). The electronic control unit 101 is further electrically connected with the LPG pump 102 to be able to control its operation. The electronic control unit 101 is further electrically connected with the acceleration pedal block 202 to be able to receive and read a signal from the acceleration pedal block 202. The electronic control unit 101 is further electrically connected with the engine temperature sensor 203 to be able to receive and read a temperature signal from the engine temperature sensor 203. The electronic control unit 101 is further electrically connected with the automobile throttle valve 206 to be able to control its opening and closing. The gas (e.g. alkane gas or mixture of alkane gases) and water vapor mixture is distributed into the air intake manifold 205, where the air flow is regulated by the throttle valve 206.

The electronic control unit 101 is further electrically connected with the water level sensor 105 to be able to receive and read a signal from the water level sensor 105. The water supply subsystem is designed to maintain the necessary water level for working of the transducer 106 in any conditions.

The electronic control unit 101 is further electrically connected with the transducer 106 and is designed to be able to send an output signal to the transducer 106; the electronic control unit 101 is further electrically connected with the gas level sensor 208 to be able to receive and read a signal from the gas level sensor 208; the electronic control unit 101 is further electrically connected with the gas supply shut-off valve 213 to be able to send output signals to control opening and closing of the shut-off valve 213.

The electronic control unit 101 is adapted to calculate a gas and water vapor mixture composition for the mixer 104, according to pre-set parameters and the information (input signals) received from the acceleration pedal block 202, the rail 201, the water level sensor 105, the transducer 106, the gas level sensor 208 and the air flow meter sensor 204.

Figure 4:
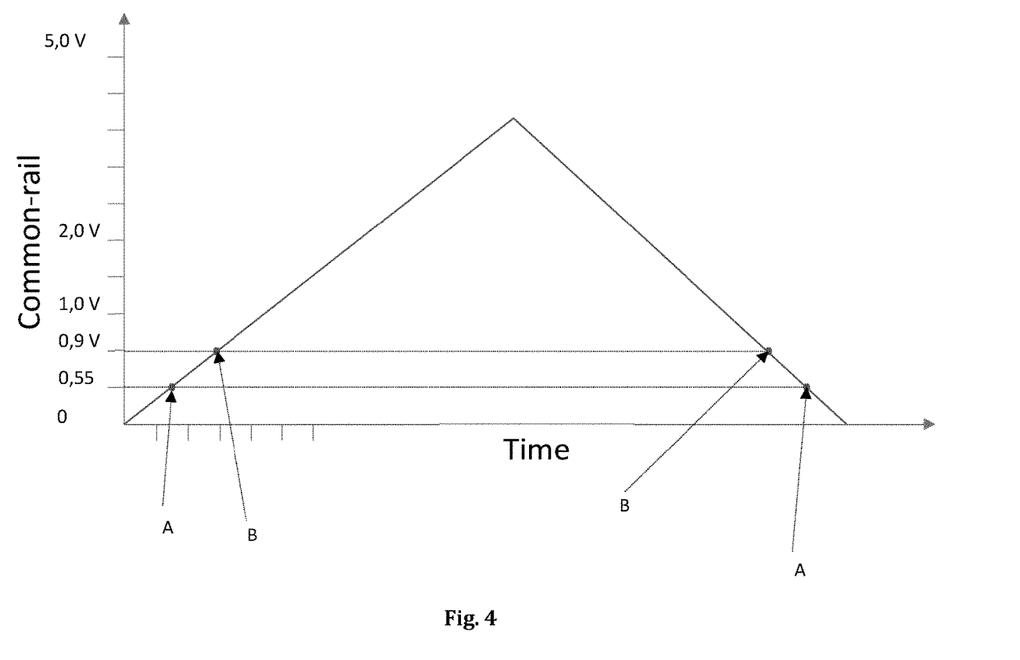
FIG. 4 is a graph, showing examples of common-rail signals causing the system to enter standby mode (A) and operation mode (B)

According to yet another embodiment the electronic control unit 101 is further electrically connected with the built-in car central electronic control unit 210. When the rail 201 sends a signal (e.g. 0.55 V) to the electronic control unit 101 (used together with the e.g. 5V signal from the built-in car central electronic control unit 210)—the system enters stand-by mode, while when the e.g. 0.9 V is received from the rail 201 (approx. 230 bar pressure in the rail 201+/−10%) the motor is running and the proposed system starts after two second delay (FIG. 4). When the signal from the rail 201 is below e.g. 0.9V, the electronic control unit 101 enters the proposed system to stand-by mode. According to the embodiment the rail 201 signal (e.g. 0.55 V) and built-in car central electronic control unit 210 signal (e.g. of 5V) is used together to enter stand-by in order to prevent system malfunctions. When one of the signals is not present, the proposed system does not start stand-by mode. For the skilled person it is obvious that the voltage level indicated above is just indicative and may have different values.

Figure 1:
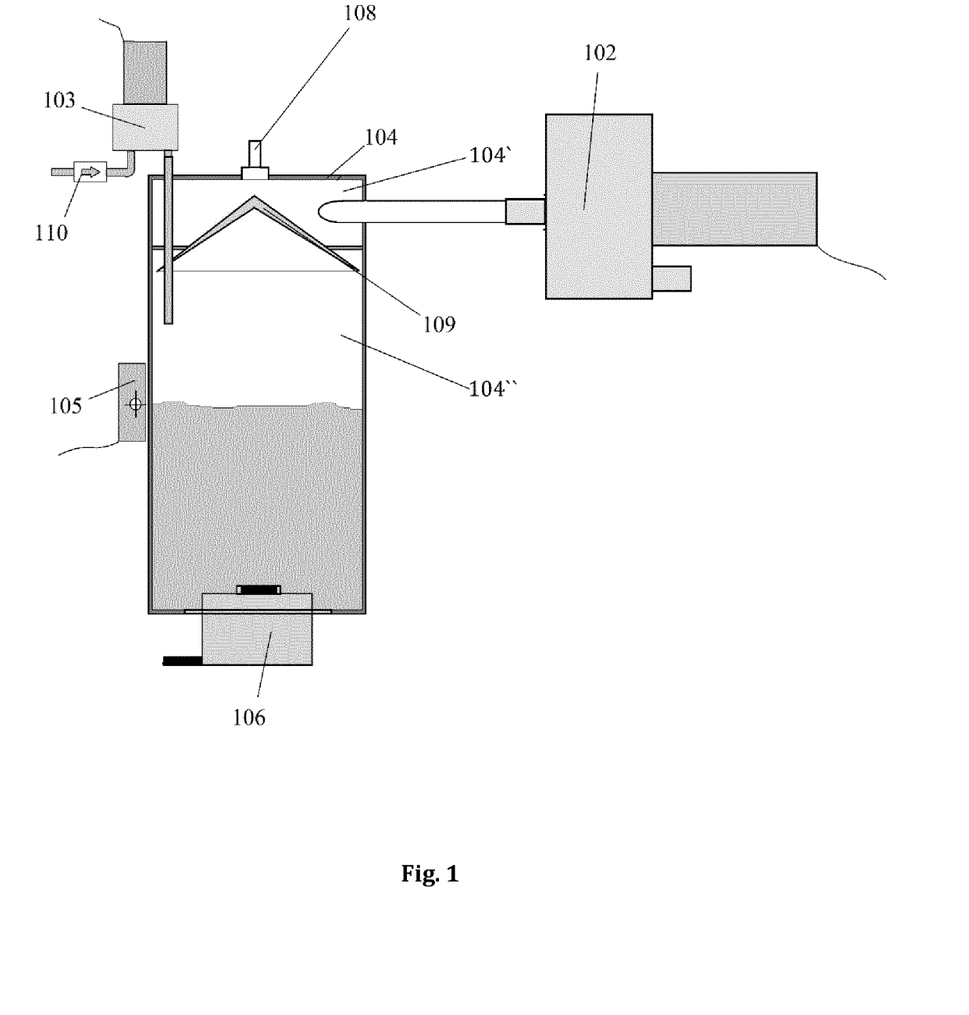
FIG. 1 is a schematic representation of the proposed gas ultrasonic transducer system.

According to the preferred embodiment of the invention, the system comprises a kit, comprising: the electronic control system 101; the mixer 104 comprising the water level sensor 105 and the ultrasonic transducer 106; the water pump 103 and the gas pump 102 adapted to be installed on an automobile having a diesel common-rail engine. The ultrasonic transducer 106 is adapted to generate water vapor and gas (e.g. alkane gas) mixture; the mixer 104 comprises two compartments: the upper compartment 104' and the lower compartment 104", the means for separation of the upper 104' and the lower 104" compartments comprising an anti-reflux valve 109 adapted to allow water vapor from the lower compartment 104" to pass through the anti-reflux valve 109 to the upper compartment 104' and to prevent liquid water from flowing into the upper compartment 104'; wherein the upper compartment 104' of the mixer 104 comprises an outlet 108 adapted to be operably connected with an engine intake manifold 205; wherein the outlet of the alkane gas pump 102 is adapted to be operably connected with the upper compartment 104' of the mixer 104, the outlet of the water pump 103 is adapted to be operably connected with the lower compartment 104" of the mixer 104, where the ultrasonic transducer 106 is at least partially located in the lower compartment 104" of the mixer 104.

According to this embodiment the water tank 209 is a windshield fluid tank already present in an automobile and the water level sensor 105 is the windshield fluid level sensor already present in the automobile's windshield fluid tank. The system can be adapted to be powered by the automobile battery. Thus, the gas pump 102 is adapted to be operably connected to the gas tank 207 already present in the vehicle. The water pump 103 is adapted to be operably connected to the water tank 209 already present in the vehicle. The electronic control unit 101 is adapted to be electrically connected to the following elements of the vehicle: rail 201, engine temperature sensor 206, acceleration pedal block 202, gas level sensor 208, alkane gas supply shut-off valve 213 and gas pressure regulator 212, air flow meter sensor 204, throttle valve 206, vehicle battery 211.

The module operates as follows. The water pump 103 fills the mixer 104, the water level sensor 105 maintains the pre-set constant level of water in the lower compartment 104", the ultrasonic transducer 106 turns on and begins to nebulize water towards the upper compartment 104' of the mixer 104. The anti-reflux valve 109 in the mixer 104 prevents any liquid water from flowing into the upper part of the mixer 104. After receiving a signal from the car acceleration pedal block 202, the electronic control unit 101 sends a signal to the gas pump 102, which introduces the gas tangentially to the upper compartment 104' of the mixer 104. The mixed gas and nebulized water (water vapor) leaves from the mixer 104 through the outlet 108 to the engine intake manifold 205, through the throttle valve 206, being controlled by the electronic control unit 101. A non-return valve 110 located before the water pump 103 ensures that the water does not return to the water tank 209 and the gas escapes when the gas pump 102 is in operation.

According to another embodiment, a diesel common-rail engine can be converted to operate only as gas (e.g. LPG, CNG, LNG, bio-LPG, bio-CNG, bio-LNG) fuel engine. According to this embodiment the system (FIG. 2) further comprises a spark plug 301 and ignition coil 302 replacing the engine's glow plug. The electronic control unit 101 is electrically connected with the spark plug 301 and the ignition coil 302 to be able to send an output signal to the spark plug 301 and the ignition coil 302. The electronic control unit 101 is further electrically connected with engine's camshaft 303 and engine's crankshaft 304 to be able to receive and read a signal from the camshaft 303 and the crankshaft 304. Replacing the engine's glow plug by a spark plug 301 and the ignition coil 302 transforms the ignition chamber to an Otto cycle engine and the detonation is started by spark using only air and the gas and water vapor mixture instead of diesel fuel. According to the present embodiment the correct moment for ignition with spark plug 301 is calculated by the electronic control unit 101 using signal from the camshaft 303 and the crankshaft 304, where the ignition process is equal to Otto cycle.

A method for operating a diesel common-rail engine, using the proposed gas ultrasonic transducer system comprises the following steps:
- (i) with electronic control unit 101 collect common rail 201 pressure signal;
- (ii) with electronic control unit 101 collect acceleration pedal signal from the acceleration pedal block 202;
- (iii) with electronic control unit 101 collect air flow signal from the air flow meter sensor 204 and collect lambda signal from lambda sensor 214;
- (iv) with electronic control unit 101 based on common rail pressure signal, acceleration pedal signal, air flow signal and lambda signal, collected on previous steps, calculate water-vapour and gas mixture;
- (v) with electronic control unit 101 send a signal to the gas pump 102 and water pump 103 to inject into the mixer 104 the pre-set amount of water and calculated amount of gas;
- (vi) with electronic control unit 101 to send a signal to ultrasonic transducer 106 to generate water vapor and gas mixture;
- (vii) conveying the generated water vapor and gas mixture through the mixer 104 outlet 108 to the engine intake manifold 205.

According to one embodiment the calculation of water-vapor (WV) and gas (G) mixture at the step (iv) can be made using the following formula: $WV+G$, where $G=((A+B)/2-C)*D$, wherein A is the common-rail pressure signal, B—acceleration pedal signal, C—air flow signal, D—lambda sensor signal and G—the effective gas (e.g. alkane gas) volume, wherein water-vapor volume is a pre-set constant value. The common-rail pressure signal, acceleration pedal signal and lambda sensor signal are calculated using the signal value in Volt. It should be noted that other ways, formulas and principles of calculation of water-vapour and gas mixture are possible.

According to yet another embodiment (FIG. 5) the method further comprises the following steps before the step (i):
- (a) with electronic control unit 101 collect engine temperature signal from the engine temperature sensor 203, if the signal corresponds to the set value, proceed to step (b), if not—return to the step (a);
- (b) with electronic control unit 101 collect common rail 201 signal, if the signal corresponds to the set value, proceed to the step (c), if not—return to the step (b);
- (c) with electronic control unit 101 collect engine electronic control unit 210 signal, if the signal corresponds to the set value, proceed to the step (d), if not—return to the step (b);
- (d) the system enters standby mode; with electronic control unit 101 collect water lever sensor 105 signal, if the signal corresponds to the set value, proceed to the step (e), if not—return to the step (d);

(e) with electronic control unit 101 collect engine common-rail 201 signal, if the signal corresponds to the set value, proceed to the step (f), if not—return to the step (d);

(f) the system enters operating mode; with electronic control unit 101 send a signal to the gas shut-off valve 213 causing valve 213 opening; further proceed to step (i) as described above.

According to the same embodiment the method further comprising the following step after the step (vii) of conveying the generated water vapor and gas mixture through the mixer 104 outlet 108 to the engine intake manifold 205: (z) with electronic control unit 101 collect common rail 201 signal; if the signal corresponds to the set value one, return to the step (ii) of collecting acceleration pedal signal from the acceleration pedal block 202; if the signal corresponds to the set value two—return to the step (c) of collecting engine electronic control unit 210 signal; if the signal does not correspond to the set value one and two-end process.

According to yet another embodiment (FIG. 5) the method further comprises the following steps before the step (i):

(a) with electronic control unit 101 collect engine temperature signal from the engine temperature sensor 203, if the signal corresponds to the set value, proceed to step (b), if not—return to the step (a);

(b) with electronic control unit 101 collect common rail 201 signal, if the signal corresponds to the set value, proceed to the step (c), if not—return to the step (b);

(c) with electronic control unit 101 collect engine electronic control unit 210 signal, if the signal corresponds to the set value, proceed to the step (d), if not—return to the step (b);

(d) the system enters standby mode; with electronic control unit 101 collect water lever sensor 105 signal, if the signal corresponds to the set value, proceed to the step (e), if not—return to the step (d);

(e) with electronic control unit 101 collect engine common-rail 201 signal, if the signal corresponds to the set value, proceed to the step (f), if not—return to the step (d);

(f) the system enters operating mode; with electronic control unit 101 send a signal to the gas shut-off valve 213 causing valve 213 opening; further proceed to step (i) as described above.

According to the same embodiment the method further comprising the following step after the step (vii) of conveying the generated water vapor and gas mixture through the mixer 104 outlet 108 to the engine intake manifold 205: (z) with electronic control unit 101 collect common rail 201 signal; if the signal corresponds to the set value one, return to the step (ii) of collecting acceleration pedal signal from the acceleration pedal block 202; if the signal corresponds to the set value two—return to the step (c) of collecting engine electronic control unit 210 signal; if the signal does not correspond to the set value one and two-end process. For the correct ignition moment in the ignition chamber for the generated water vapor and gas mixture, the electronic control unit 101 collects signal the from the camshaft 303 and the crankshaft 304. Based on the collected signals the electronic control unit 101 sends a signal to the spark plug 301. The processing of the signals from the camshaft 303 and the crankshaft 304 is made according to the known from the prior art Otto-cycle.

The invention claimed is:

1. A gas ultrasonic transducer system for operating a diesel common-rail engine, comprising: an electronic control unit; a water tank; a gas tank with a gas supply shut-off valve; a gas level sensor; a gas pump operably connected with the gas tank; a water pump operably connected with the water tank; a mixer comprising a water level sensor and an ultrasonic transducer adapted to generate water vapor and gas mixture; characterized in that the mixer, configured for mixing water vapor and gas, comprises two compartments: the upper compartment and the lower compartment, the means for separation of the upper and the lower compartments comprising an anti-reflux valve adapted to regulate the flow of water vapor from the lower compartment to the upper compartment, while preventing liquid water from flowing into the upper compartment; wherein the upper compartment of the mixer comprises an outlet operably connected with an engine intake manifold; wherein the outlet of the gas pump is operably connected with the upper compartment of the mixer, the outlet of the water pump is operably connected with the lower compartment of the mixer, where the ultrasonic transducer is at least partially located in the lower compartment of the mixer; and wherein said gas ultrasonic transducer system is configured to transition between a first mode of operation, being a standby mode, and a second mode of operation, being an operation mode.

2. The system according to claim 1, the system further comprising an air flow meter sensor operably connected between the mixer outlet and the engine intake manifold, the air flow meter sensor is further electrically connected with the electronic control unit and is adapted to measure the gas mixture flow and to send respective signals to the electronic control unit; the system further comprising the lambda sensor operably connected with engine exhaust system, the lambda sensor is further electrically connected with the electronic control unit and is adapted to measure the proportion of oxygen in the gas or liquid being analysed and to send respective signals to the electronic control unit.

3. The system according to claim 2, wherein the electronic control unit is electrically connected with the rail and designed to receive and read the common-rail pressure signal from the rail; the electronic control unit is further electrically connected with an acceleration pedal block to be able to receive and read a signal from the acceleration pedal block; the electronic control unit is further electrically connected with an engine temperature sensor to be able to receive and read a temperature signal from the engine temperature sensor; the electronic control unit is further electrically connected with an automobile throttle valve to be able to control its opening and closing; the electronic control unit is further electrically connected with the water level sensor to be able to receive and read a signal from the water level sensor; the electronic control unit is further electrically connected with the transducer to be able to send an output signal to the transducer; the electronic control unit is further electrically connected with the gas level sensor to be able to receive and read a signal from the gas level sensor; the electronic control unit is further electrically connected with the gas supply shut-off valve to be able to control opening and closing of the shut-off valve; the electronic control unit is further electrically connected with the lambda sensor to be able to receive and read a signal from the lambda sensor, wherein the electronic control unit is adapted to calculate a gas and water vapor mixture composition for the mixer, according to pre-set parameters and input signals received from the acceleration pedal block, the rail, the water level sensor, the transducer, the gas level sensor, the air flow meter sensor and the lambda sensor.

4. The system according to claim 1, wherein the electronic control unit is further electrically connected with the built-in car central electronic control unit.

5. The system according to claim 1, wherein the system is adapted to be powered by an automobile battery.

6. The system according to claim 1, wherein the system further comprises a spark plug and an ignition coil replacing the engine's glow plug, wherein the electronic control unit is electrically connected with the spark plug and the ignition coil to be able to send an output signal to the spark plug and the ignition coil; wherein the electronic control unit is further electrically connected with engine's camshaft and engine's crankshaft to be able to receive and read a signal from the camshaft and the crankshaft.

7. A kit for installing a gas transducer system for operating a diesel common-rail engine according to claim 1, wherein the kit comprising: an electronic control system; a mixer comprising a water level sensor and an ultrasonic transducer; a water pump and a gas pump; wherein the ultrasonic transducer is adapted to generate water vapor and alkane gas mixture; the mixer, configured for mixing water vapor and gas, comprises two compartments: the upper compartment and the lower compartment, the means for separation of the upper and the lower compartments comprising an anti-reflux valve adapted to regulate the flow of water vapor from the lower compartment to the upper compartment, while preventing liquid water from flowing into the upper compartment; wherein the upper compartment of the mixer comprises an outlet adapted to be operably connected with an engine intake manifold; wherein the outlet of the alkane gas pump is adapted to be operably connected with the upper compartment of the mixer, the outlet of the water pump is adapted to be operably connected with the lower compartment of the mixer, where the ultrasonic transducer-is at least partially located in the lower compartment of the mixer, and wherein said gas ultrasonic transducer system si configured to transition between a first mode of operation, being a standby mode, and a second mode of operation, being an operation mode.

8. The kit according to claim 7, wherein the kit further comprises the spark plug and an ignition coil.

9. A method for operating a diesel common-rail engine, using the gas ultrasonic transducer system according to claim 1, the method comprising the following steps: (i) with electronic control unit collect common rail pressure signal; (ii) with electronic control unit collect acceleration pedal signal from the acceleration pedal block; (iii) with electronic control unit collect air flow signal from the air flow meter sensor and lambda signal from lambda sensor; (iv) with electronic control unit based on common rail pressure signal, acceleration pedal signal, air flow signal and lambda signal, collected on previous steps, calculate water-vapour and gas mixture using formula WV+G, wherein $G=((A+B)/2-C)*D$, and wherein WV is the pre-set constant value of the water-vapor volume, G is the calculated effective gas volume, A is the common-rail pressure signal, B is the acceleration pedal signal, C is the air flow signal, and D is the lambda sensor signal; (v) with electronic control unit send a signal to the gas pump and water pump-to inject into the mixer the pre-set amount of water and calculated amount of gas; (vi) with electronic control unit to send a signal to ultrasonic transducer to generate water vapor and gas mixture; (vii) conveying the generated water vapor and gas mixture through the mixer outlet to the engine intake manifold.

* * * * *